United States Patent
Vallone et al.

(10) Patent No.: US 12,028,113 B2
(45) Date of Patent: Jul. 2, 2024

(54) POLARIZATION MODULATION METHOD OF PHOTONIC PULSES FOR GENERATING QUANTUM CRYPTOGRAPHIC KEYS, AND RELATED POLARIZATION MODULATOR

(71) Applicant: UNIVERSITÀ DEGLI STUDI DI PADOVA, Padua (IT)

(72) Inventors: Giuseppe Vallone, Padua (IT); Costantino Agnesi, Padua (IT); Marco Avesani, Padua (IT); Paolo Villoresi, Padua (IT)

(73) Assignee: UNIVERSITÀ DEGLI STUDI DI PADOVA, Padua (IT)

( * ) Notice: Subject to any disclaimer, the term of this patent is extended or adjusted under 35 U.S.C. 154(b) by 0 days.

(21) Appl. No.: 17/769,472

(22) PCT Filed: Oct. 20, 2020

(86) PCT No.: PCT/EP2020/079471
§ 371 (c)(1),
(2) Date: Apr. 15, 2022

(87) PCT Pub. No.: WO2021/078723
PCT Pub. Date: Apr. 29, 2021

(65) Prior Publication Data
US 2024/0129040 A1    Apr. 18, 2024

(30) Foreign Application Priority Data
Oct. 21, 2019 (IT) .......................... 102019000019373

(51) Int. Cl.
*H04B 10/00* (2013.01)
*H04B 10/532* (2013.01)
(Continued)

(52) U.S. Cl.
CPC ........... *H04B 10/532* (2013.01); *H04B 10/70* (2013.01); *H04L 9/0858* (2013.01)

(58) Field of Classification Search
CPC ..................................................... H04B 10/70
See application file for complete search history.

(56) References Cited

U.S. PATENT DOCUMENTS

| | | | |
|---|---|---|---|
| 5,311,592 A | 5/1994 | Udd | |
| 2010/0002881 A1* | 1/2010 | Youn | ...................... H04B 10/70 380/278 |

(Continued)

FOREIGN PATENT DOCUMENTS

| | | |
|---|---|---|
| CN | 105680955 B | 9/2018 |
| CN | 109257104 A | 1/2019 |

OTHER PUBLICATIONS

Costantino Agnesi et al: "All-fiber self-compensating polarization encoder for Quantum Key Distribution", arxiv.org, Cornell University Library, 201 Olin Library Cornell University Ithaca, NY 14853, Mar. 2, 2019, XP081125155.

*Primary Examiner* — Daniel G Dobson
(74) *Attorney, Agent, or Firm* — Volpe Koenig

(57) ABSTRACT

A polarization modulation method of photonic pulses, in particular for generating quantum cryptographic keys, ensures an optimum stability of the outgoing polarization states, and comprises the steps of: generating a plurality of photonic pulses with an unspecified polarization state obtained by the overlapping of both the horizontal and vertical polarization modes thereof, and routing them in a first polarization-maintaining fiber; splitting said horizontal and vertical polarization modes and routing them in respective terminals of a second polarization-maintaining fiber forming a ring, whereby they travel such ring clockwise and counter-clockwise respectively, or vice versa; inducing a respective phase modulation ($o_e$, $o_l$) of both said polarization (Continued)

modes, in one point of said ring which is spaced from said terminals by optical paths having different length along said ring, thereby a polarization-maintaining fiber delay line is determined; and recombining said polarization modes in one single photonic pulse beam, and routing the resulting beam through said first polarization-maintaining fiber, by obtaining, at the output thereof, a polarization state of the pulses depending upon the difference between said phase modulations ($o_e$, $o_l$).

16 Claims, 5 Drawing Sheets

(51) Int. Cl.
     *H04B 10/70*     (2013.01)
     *H04L 9/08*     (2006.01)
     *H04J 14/00*     (2006.01)

(56) References Cited

U.S. PATENT DOCUMENTS

2012/0189238 A1* 7/2012 Ruchet ................ G02B 6/2935
                                                                                                 385/11
2019/0260478 A1    8/2019 Lucamarini et al.

* cited by examiner

POLARIZATION MODULATION METHOD OF PHOTONIC PULSES FOR GENERATING QUANTUM CRYPTOGRAPHIC KEYS, AND RELATED POLARIZATION MODULATOR

The present invention relates to a polarization modulation method of photonic pulses, which are used within a quantum key distribution system for generating quantum cryptographic keys, which can be used in quantum communication networks and in particular in systems for protecting the communications which take place through such networks. The present invention further relates to a polarization modulator implementing the above-mentioned polarization method.

With photonic pulses, or optical pulses, it is meant the generation of photons with the purpose of establishing a quantum status constituting the base unit in a quantum communication system. The quantum state then is equivalent to the bit of the digital communication protocols, and it is also designated as qubit, or quantum bit.

In particular, the so-called Quantum Key Distribution (or QKD) allows two entities, which are separated at a certain distance to each other, to generate, through an exchange of qubits encoded into photons, a secure cryptographic key known only to them, which will enable these two parts to encipher and decipher the messages they will exchange through a conventional channel.

The safety of these keys is intrinsically guaranteed by the principles of quantum mechanics, as a third party, trying to obtain information on this cryptographic key to use it then to illegally decipher the messages exchanged between said entities, would be detected by them, since any measurement process applied to a quantum system, which should be used to extract the cryptographic key, would inevitably disturb the quantum system itself.

These keys for example can be exploited to communicate encrypted messages by using safe cryptographic algorithms, such as Vernam cipher, wherein the encryption key is as long as the text to be enciphered and then it cannot be re-used but it has to be regenerated.

The quantum key distribution then arouses much interest in academic, military and even commercial fields, for the protection and safety of the classified communications but, considering the advantages which this technology promises in improving the security of communications, in general terms the quantum key distribution implementation problem should be dealt with, for example in an optical fiber network, or in free-space or satellite channels, linking several entities requiring to exchange protected information by means of an on their own generated cryptographic key.

The practical implementation of the quantum key distribution, among other things, requires a quick modulation of the degrees of freedom of the photons used to generate the cryptographic key, and one of the degrees of freedom which can be used to such purpose is polarization.

In other words, the polarization of one single photon, which generally can be represented as the superposition of two distinct orthogonal states corresponding to the horizontal polarization and to the vertical polarization, can be used to encode a qubit.

However, in order to obtain a string of polarization states from a stream of photonic pulses, indeed it is necessary to make a modulation of the polarization, and the methods known for modulating the photon polarization generally result to be poorly effective, and in some cases even not adequate to guarantee the security of the implemented protocol.

A way to modulate the polarization is based on the use of birefringent in-line configuration modulators, such as described for example in M. Jofre et al., "100 MHz Amplitude and Polarization Modulated Optical Source for Free-Space Quantum Key Distribution at 850 nm", *J. Light. Technol.* 28, 2572 (2010); and F. Gruinenfelder et al., "Simple and high-speed polarization-based QKD", *Appl. Phys. Lett.* 112, 051108 (2018).

These modulators operate by exploiting the electro-optical effect of a birefringent crystal, typically Lithium Niobate ($LiNbO_3$); in the electro-optical crystals the refraction index depends upon a control voltage, applied to a modulator embodied by said crystal, and driven by an input electric signal and, as these are birefringent crystals, the ordinary and extraordinary refraction indexes vary differently depending upon this tension. Then, the birefringence, and thus the phase between the polarizations, can be controlled through the control voltage. However, this kind of modulators suffers the disadvantage of requiring both non-standard components, making it very expensive, and high voltages, to induce the required modulation.

The crystal birefringence of the modulators even induces a dispersion of the polarization modes, reducing the degree of polarization for short pulses, by degrading the modulation performances and reducing the performances of the quantum key distribution protocol. Moreover, any deviation in either temperature or in the electric signal modifies the light polarization in an uncontrolled way, and so it is for the effectiveness in implementing a quantum key distribution.

The phase modulation $\phi$ introduced by the modulator, in fact, depends upon both the voltage of the electric signal provided to the modulator and the temperature of the modulator itself, and, to obviate this problem, it is then required to stabilize both the temperature and the control voltage of the modulator.

Subsequently, to obviate the above-described problem, a kind of modulator was introduced, wherein a birefringent modulator is inserted in a double-passage system by exploiting a Faraday mirror, as described in I. Lucio-Martinez, et al., "Proof-of-concept of real-world quantum key distribution with quantum frames", *New J. Phys.* 11, 095001 (2009).

According to the newly proposed system, a disadvantage remains, linked to the need for having non-standard components, and for further requesting high control voltages to induce the required phase modulation. Moreover, even the dispersion of the polarization modes is not fully compensated, thus allowing poor modulation performances only, and reducing the performances of quantum key distribution protocol.

Another solution is represented by a polarization modulator system, wherein a plurality of different lasers is used, one for each polarization mode involved within the quantum key distribution protocol, three or four for example. This approach is described, for example, in: S. K. Liao, et al. "Satellite-to-ground quantum key distribution", *Nature* 549, 43 (2017); S.-K. Liao, et al. "Long-distance free-space quantum key distribution in daylight towards inter-satellite communication", *Nat. Photonics* 11, 509 (2017); and D. Bacco, et al., "Experimental quantum key distribution with finite-key security analysis for noisy channels", *Nat. Commun.* 4, 2363 (2013).

However, even this solution is very expensive due to the use of several independent lasers, as many temperature controllers and corresponding current generators thereof. Moreover, if lasers are not calibrated and controlled in an absolutely corrected way, this implementation could be poorly safe for the quantum key distribution, since vulnerable to attacks as those described in article Lee, M. S. et al, "Quantum hacking on a free-space quantum key distribution system without measuring quantum signals", *J. Opt. Soc. Am.* B 36, B77 (2019).

An overcoming of the problems described with reference to the herein highlighted state of art is represented by a modulator described in Agnesi, C., Avesani, M., Stanco, A., Villoresi, P. & Vallone, G. "All-fiber self-compensating polarization encoder for quantum key distribution", *Opt. Lett.* 44, 2398 (2019).

In this modulator, a polarized light pulse, generally produced by means of a laser, is injected in an input port of an optical circulator, to go out then from an output port through a single-mode fiber.

Subsequently, the pulse reaches a polarization controller which converts the light polarization into a balanced superposition of the horizontal and vertical polarization modes. The light then reaches a polarization beam splitter (PBS) which separates the two orthogonal polarization modes and injects them separately in two different polarization-maintaining fibers 111, 112 (see FIG. 1), and, in both cases, the injected light is aligned with the so-called slow axis of the polarization-maintaining fiber, according to the standard behaviour of the fiber polarization beam splitters.

Under polarization-maintaining optical fiber (see FIG. 2A-PM fiber), or simply PM fiber, a particular single-mode optical fiber is meant comprising, for the whole extension thereof, an intentionally obtained birefringence in the optical fiber, with the purpose of keeping substantially unaltered the two horizontal and vertical polarization modes of a polarized light during the propagation thereof along the fiber itself. This further causes two different propagation speeds of the two polarization modes, called slow axis and fast axis.

Downstream of the polarization beam splitter, a Sagnac loop is determined since the two polarization-maintaining fibers re-join by forming a ring, and the two so separated horizontal and vertical polarization modes travel in opposite directions, i.e. clockwise for one mode and counter-clockwise for the other one, by causing in this ring a typical interference between the two signals, the ring thus determining a so-called Sagnac interferometer, wholly constituted of polarization-maintaining devices.

For a more ready reference, this modulator is represented in FIG. 1, wherein CIRC designates the optical circulator, PBS designates a polarization beam splitter, PC designates a polarization controller, and wherein the ring made of polarization-maintaining fiber implementing the Sagnac interferometer is designated with 100, the polarization modulator is designated as a whole with 1, the laser generator with 2.

Clockwise, the pulse reaches a phase modulator 101, for example of the type made of Lithium Niobate, introducing a first phase $\phi_e$ and subsequently a delay line 102 formed by a polarization-maintaining fiber having an adequate length ΔL. In the opposite direction, i.e. counter-clockwise, first the pulse reaches the delay line 102 and, subsequently, the phase modulator 101 introducing a second phase $\phi_l$.

The phase modulator 101 is driven by a control voltage which can be provided by means of a square-wave voltage modulation.

Considering that in a Sagnac interferometer the light is always aligned to the slow axis of the polarization-maintaining fibers, and that the same optical path is used in both clockwise and counter-clockwise directions, no modal dispersion effect is produced. Moreover, it is ensured that the light perfectly recombines in the polarization beam splitter PBS, once travelled through the interferometer ring 100.

At last, the phase modulator 101 works only in on one single polarization, and it is not required that it should guide two orthogonal polarizations as disclosed with reference to one of the previously mentioned examples of the state of art.

At the output of the polarization beam splitter PBS, the polarization state is given by the formula:

$$|\psi_{out}^{\phi_e,\phi_l}\rangle = \frac{1}{\sqrt{2}}(|H\rangle + e^{i(\phi_e-\phi_l)}|V\rangle)$$

then the possible states of the qubit depend only upon the difference between the first and the second phase $\phi_e$, $\phi_l$ induced by the phase modulator 101: this feature makes the design of this modulator with the Signac interferometer immune to all deviations due to either temperature or electric voltage fluctuations.

This modulator design allows to implement a quantum key distribution scheme according to BB84 protocol, providing the use of states which are non-orthogonal to each other, by using only standard components.

However, this type of modulator has two limitations having a certain significance.

As a matter of fact, the presence of single-mode and non-polarization-maintaining fiber before the polarization beam splitter, and then the possible qubit states they depend upon, all demand the modulator is manually calibrated by means of the above-mentioned polarization controller (PC), to obtain a balanced superposition of the horizontal and vertical polarization modes at the input of the polarization beam splitter, and this forcedly involve the continuous presence of an operator allowing the polarization modulator to be correctly operated.

Further, the single-mode fiber 105, the section thereof being designated with 106, which drives the light from the polarization beam splitter to a second output port 103 of the CIRC optical circulator, induces a unitary polarization state transformation which cannot be determined a priori, and this complicates the implementation of the quantum key distribution protocols, since an additional calibration phase of the so-called polarization bases is introduced.

At last, it is necessary to consider the fact that, in this type of modulator, fiber temperature variations can change the corresponding unitary transformation.

The herein described modulator design is further implemented with some differences, for example by replacing the polarization beam splitter with a Polarization Beam Displacer (PBD) and with a Faraday rotator as well, as described in Jiang, Y.-F. et al. "Remote Blind State Preparation with Weak Coherent Pulses in the Field", *Phys. Rev. Lett.* 123, 100503 (2019).

Instead, in Ya-Ping Li et al. "The realization of a reference-frame-independent decoy BB84 quantum key distribution based on Sagnac-interferometer", *Opt. Lett.* 4, 4523 (2019), the polarization beam splitter is maintained, but it does not couple both horizontal and vertical polarization modes along the "slow" axis of the polarization-maintaining fiber, but it couples one along the fast axis and the other one along the slow axis. This difference requires the introduction of a polarization rotator, e.g. a Faraday rotator, to compensate the mode dispersion effects.

It is to be noted that, in these modulators using a polarization-maintaining fiber Sagnac interferometer, the phase modulator is still asymmetrically positioned, whereby the pulse travelling clockwise reaches the modulator with a different timing with respect to the pulse circulating counter-clockwise.

Differently, according to a scheme however similar to those previously described, S. Wang, et al., Practical gigahertz quantum key distribution robust again st channel disturbance, *Opt. Lett.* 43, 5110 (2018) discloses a modulator wherein an attempt is made to obtain a stable phase modulator, working with any kind of input polarization, by using an electro-optical modulator placed in the middle of the Sagnac interferometer ring, whereby the pulses travelling clockwise and counter-clockwise simultaneously reach the modulator.

US patent application No. 2019/0260478 A1 discloses a transmitter design for a quantum communication system with a Sagnac interferometer which is used to implement a stable intensity modulator.

Chinese patent application No. 109 257 104 A, Chinese patent No 105 680 955 and U.S. Pat. No. 5,311,592 A all disclose further known embodiments of polarization modulation methods for photonic quantum communications or optical encryption.

In conclusion, in the polarization schemes which have been mentioned with reference to the state of art, there are certain drawbacks: in particular, in the previously described devices the need may arise for aligning, by means of a polarization controller, the input polarization, mainly due to possible temperature variations and mechanical stresses. The required adjustments could require very long execution time, in the order of hours or even days, by actually making a quantum key distribution system unusable.

The article Y. Li et al., High-speed robust polarization modulation for quantum key distribution, Optics Lett. Doc ID 374485, to face the above-mentioned problem discloses a system using a polarization-maintaining fiber oriented at 45°, a fiber beam splitter followed by two polarizers and a Sagnac interferometer. The output is represented by a single-mode fiber.

The output polarization of some of the above-mentioned polarization devices is subjected to variation over time, due to the presence of single-mode optical fibers, and this represents a drawback in particular for the free space applications.

At last, known devices cannot be automatically reconfigured to change the coding thereof, and this entails a limitation in the widespread use of quantum key distribution.

The technical problem underlying the present invention is to provide a polarization modulation method of photonic pulses allowing to obviate the drawbacks mentioned with reference to the known art.

Such a problem is solved by a polarization modulation method as above specified, comprising the steps of:
generating a stream of photonic pulses, each one comprising a given polarization mode obtained by the superposition of both the horizontal and the vertical polarization modes thereof, and routing them into a first polarization-maintaining fiber;
splitting, inside said first polarization-maintaining fiber, said horizontal and vertical polarization modes, and routing them through respective terminals of a second polarization-maintaining fiber forming a ring, whereby they travel such ring clockwise and counter-clockwise respectively, or vice versa;
inducing a respective phase modulation of both said polarization modes, in one point of said ring which is spaced from said terminals by optical paths having different length along said ring, thereby a polarization-maintaining fiber delay line is determined; and
recombining said polarization modes in one single photonic pulse beam, and routing the resulting beam through said first polarization-maintaining fiber, by obtaining, at the output thereof, a polarization state of the pulses depending upon the difference between said phase modulations.

The invention further relates to a polarization modulator comprising a generator of photonic pulses, routing photonic pulses through a first polarization-maintaining optical fiber toward a polarization beam splitter, to which two terminals of a second polarization-maintaining fiber are connected, forming a ring, said terminals receiving, from the polarization beam splitter, a respective polarization mode coming from said first polarization-maintaining optical fiber, a phase modulator being provided acting on said polarization modes in a point, of such ring, which is spaced from said terminals by optical paths, along said ring, having different length, thereby a polarization-maintaining fiber delay line is determined, a beam splitter, or an analogous device, being provided to split a returning beam, the splitter being arranged between the input of said first polarization-maintaining optical fiber and the photonic pulses generator, whereby the first polarization-maintaining optical fiber is again fully travelled by the returning beam.

The above-defined method and modulator can be used within the field of the quantum key distribution to generate cryptographic keys of quantum kind, and usable according to one of the known quantum communications protocols to secure the transmission of classified data. In this way, it is possible to effectively exploit the polarization for free space applications, wherein the polarization is by far the most preferable freedom degree. Thanks to the stability of the output polarization states, a calibration between transmitter and receiver, to obtain a low quantum bit error rate, is not required. The modulator could be used even in a receiving apparatus within a quantum key distribution, to quickly change the measurement base.

At last, it is to be noted that the control voltages, which are required in the method and in the modulator according to the present invention, are significantly lower, by a factor 1.5 or 3, with respect to the technologies of the state of art not using the Sagnac effect.

It is further to be meant that the present invention could be generally used in all the applications requiring a fast modulation of the polarization, then even in the communications of conventional kind.

The present invention will be disclosed hereinafter, according to a preferred embodiment thereof, provided by way of example and not for limitative purposes with reference to the enclosed drawings, wherein:

FIG. 2A shows a cross section of a position-maintaining fiber;

Figure 2:
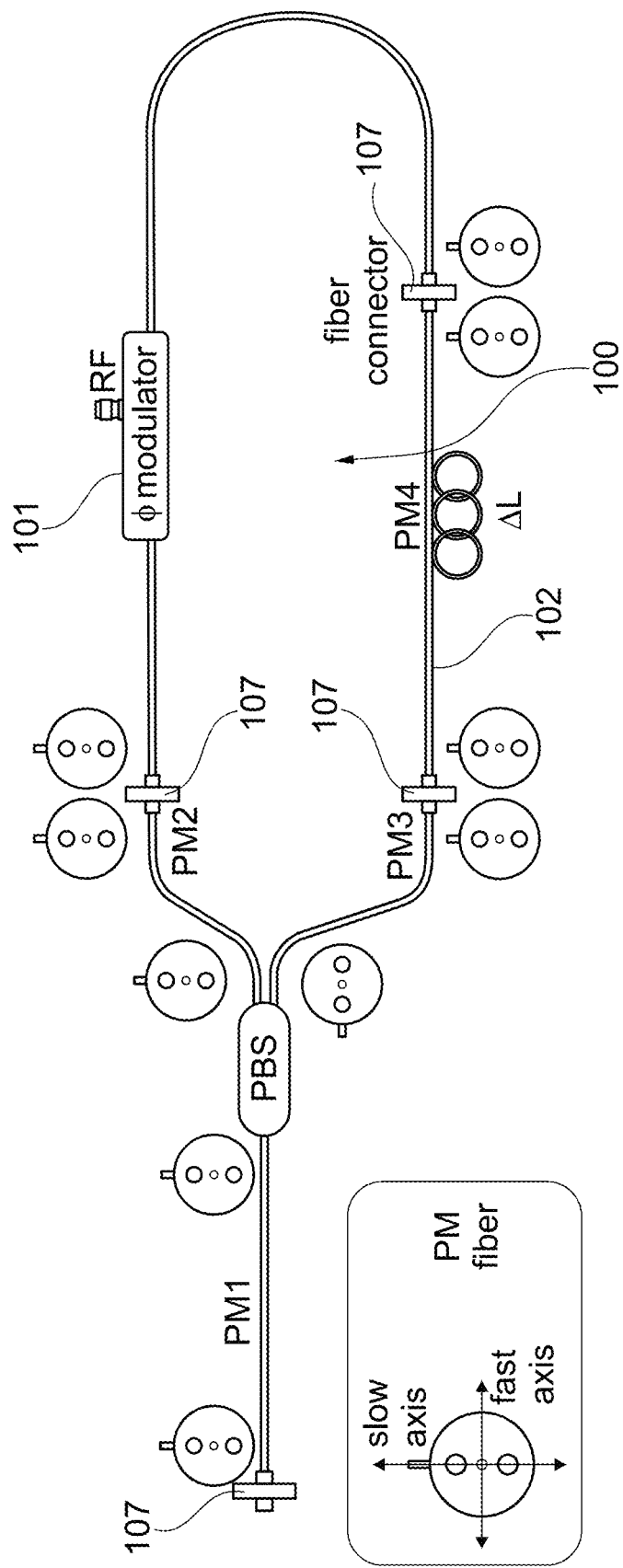
FIG. 2 shows a functional schematic view illustrating some portions of a polarization modulator implementing the polarization modulation method according to the invention.

With reference to FIG. 2, a modulator functional layout, to implement the polarization modulation method according to the invention, comprises a first polarization-maintaining fiber PM1 which receives photonic pulses, each one comprising a given polarization state obtained by the overlapping of the horizontal and vertical polarization thereof.

The first polarization-maintaining fiber PM1 is connected to a fiber polarization beam splitter PBS which is capable of slitting said photonic pulses, realising a photonic beam travelling the first polarization-maintaining fiber PM1, in two distinct beams of photonic pulses, each one having different and respective polarizations, i.e. horizontal polarization H and vertical polarization V.

Therefore, the first fiber PM1 is aligned thereby the polarization beam splitter PBS splits the two polarizations, corresponding to the fast and to the slow axes of the fiber PM1, by injecting them respectively in the two terminals of a second polarization-maintaining fiber 102, the separated terminals thereof are designated with PM2 and PM3.

In the present embodiment, both the polarization modes, at the two outputs of the polarization beam splitter PBS, are aligned with the respective low axes (FIG. 2A) of the fiber, according to the standard behaviour of the fiber polarization beam splitters PBS.

The terminals PM2 and PM3 are connected, thus forming a ring 100, determining a polarization-maintaining fiber delay line PM4, with an adequate length $\Delta L$, due to the presence of a phase modulator 101 in a point of said ring which is spaced from said terminals by optical paths, along said ring, having different lengths, thereby said polarization-maintaining fiber delay line is realised thanks to the difference in length of the two resulting paths.

In this way, the second polarization-maintaining fiber 102, from its terminals PM2 and PM3, implements a ring interferometer of Sagnac kind.

Considering the input polarization, if the following is a general polarization $\alpha|H\rangle+b|V\rangle$ the polarization reaching the polarization beam splitter PBS will be $\alpha|H\rangle+be^{i\delta}|V\rangle$ Then, the intensity ratio between the horizontal H and vertical V polarization does not change. The phase $\delta$ of course depends upon the fiber temperature and mechanical stress.

However, it is to be noted that, if the coherence time of the input pulse is very short, the delay between the horizontal polarization |H⟩ and the vertical polarization |V⟩ could be higher than the coherence time, resulting in a depolarized state at the input of the polarization beam splitter PBS. In each case, the intensity ratio between the horizontal H and vertical V polarization components does not change.

After the passage through the Sagnac interferometer, the horizontal H and vertical V polarizations, at the output of the polarization beam splitter PBS towards the first polarization-maintaining fiber PM1, reverse, as a result of how the section of polarization-maintaining fiber delay line PM4 is connected.

The section of first polarization-maintaining fiber PM1 is then fully travelled again by the return beam from the polarization beam splitter PBS.

Then, the light will be emitted by the device from the same input terminal of the first fiber PM1 and with the following polarization $\alpha|V\rangle+b|H\rangle$ which has no dependence upon said phase $\delta$, considering that the offset imposed in this output path exactly compensates the one suffered through the input path. Then, it has to be noted that even if the delay between horizontal H and vertical V polarizations is eventually higher than the coherence time in the passage in the first fiber PM1, such delay compensates in the return path, since the polarizations H and V result to have exchanged.

The herein described layout can be implemented by introducing some variants.

For example, the light at the two outputs of the polarization beam splitter PBS could be aligned with the fast axis of the ends of fiber PM2 and PM3, instead of with their slow axis.

Otherwise, the polarization beam splitter PBS does not couple both polarization modes along the fiber slow axis, but it could couple one of them along the fast axis and the other one along the slow axis. This difference requires the possible insertion of a device for rotating the polarization, e.g. a Faraday rotator, which rotates the polarization and then it is capable of compensating the mode dispersion effects in case said polarization beam splitter PBS aligns the split polarization modes to the fast and slow axes, or vice versa, of the respective terminals PM2, PM3 of the second polarization-maintaining fiber 102.

Figure 3:
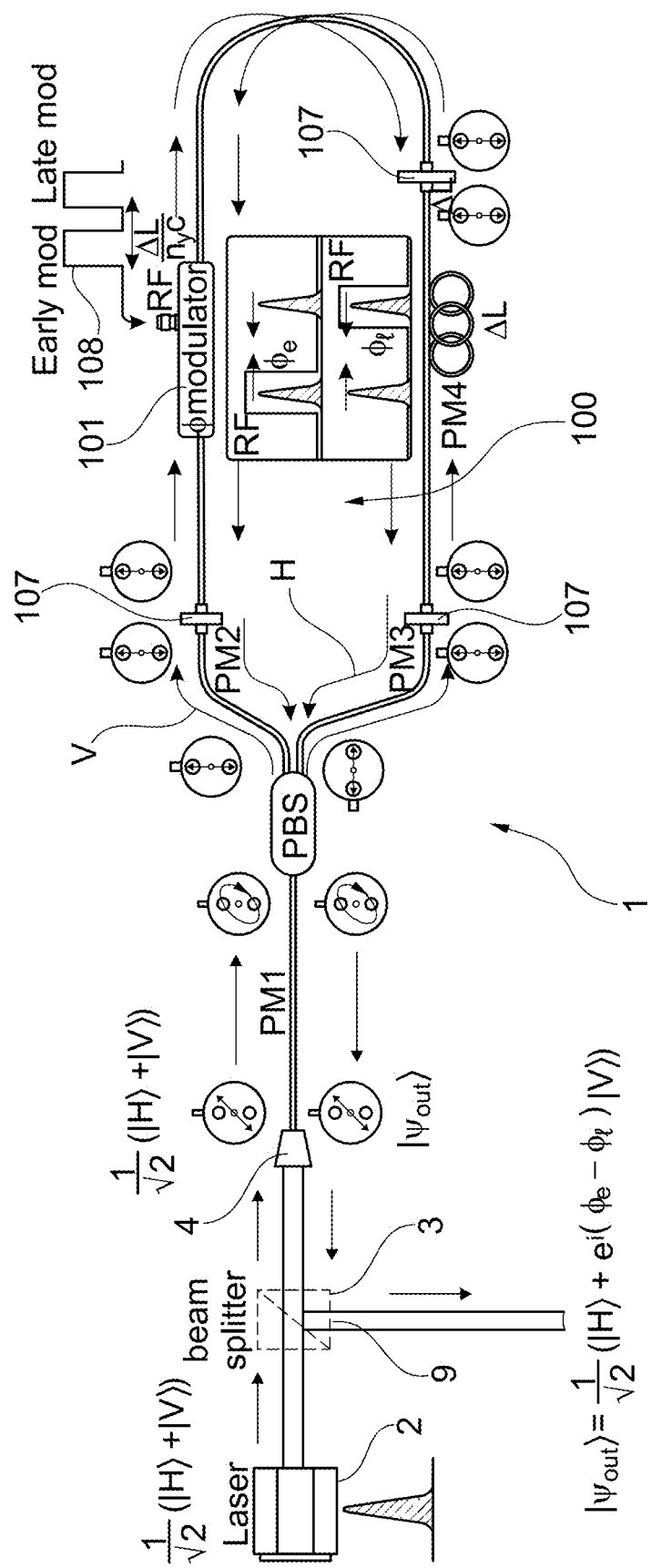
FIG. 3 shows a schematic view illustrating a Sagnac effect polarization modulator according to the invention.

An implementation of the layout of FIG. 2 is shown in the polarization modulator of FIG. 3, designated as a whole with 1.

Figure 1:
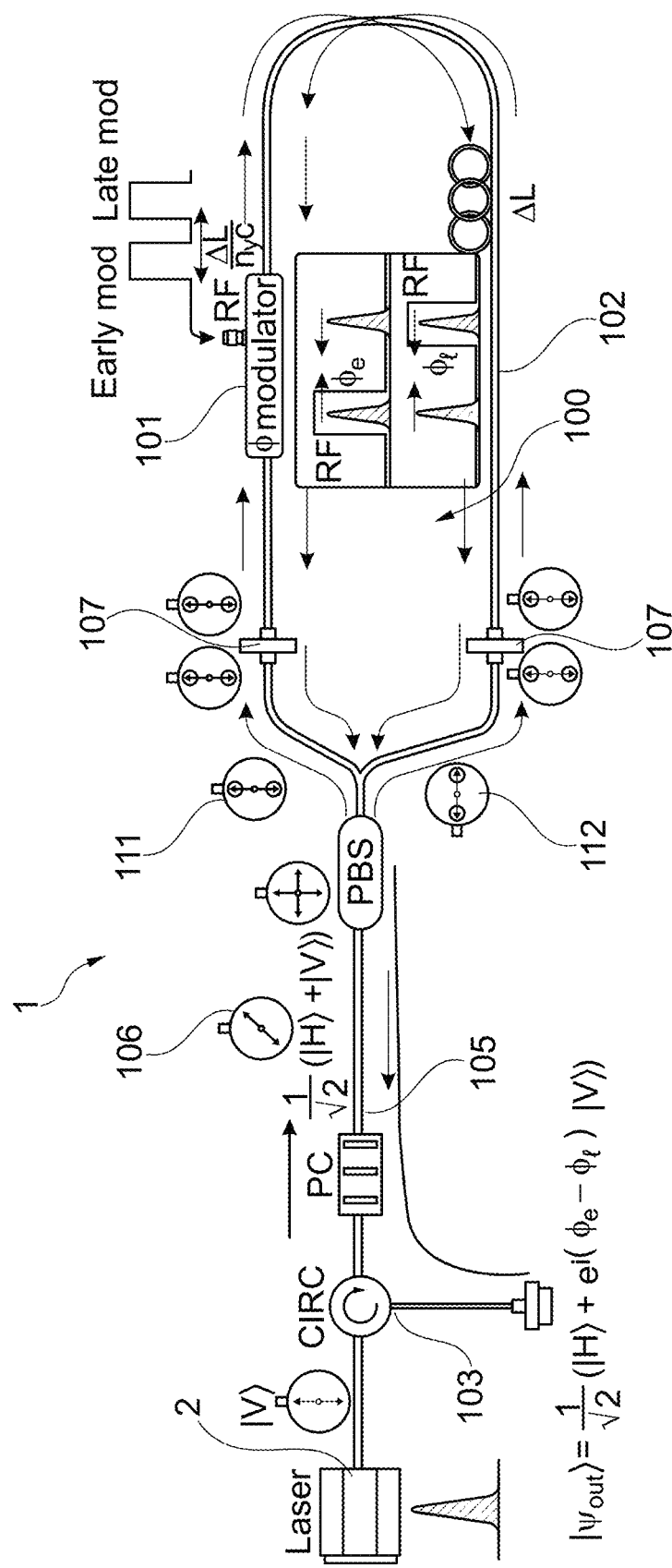
FIG. 1 shows a schematic view illustrating a Sagnac effect polarization modulator of the state of art of the present invention.

It has some parts in common with the modulator of the state of art, described with reference to FIG. 1, which have even the same numeral references, with particular reference to the description of the ring 100.

Fiber connectors 107 are provided, connecting the different sections of optical fiber to obtain the ring 100.

They can be replaced by fibers with different length or junctions of fusion fibers.

The polarization modulator 1 comprises a laser generator 2 to produce photonic pulses, each one comprising a given polarization state obtained by the superposition of the horizontal and vertical polarizations thereof.

Said photonic pulses are emitted so that they cross a beam splitter 3, or another analogous device to split the input beam from the output beam, not to be confused with a polarization beam splitter, which, along this direction, does not perform splitting but routes the photonic pulse optical beam in a fiber coupler 4, connected at the output thereof with said first polarization-maintaining optical fiber PM1.

In the present embodiment, the pulses are polarized in the diagonal polarization state $$|D\rangle = \frac{1}{\sqrt{2}}(|H\rangle + |V\rangle)$$

in the first polarization-maintaining fiber PM1 (FIG. 3).

Thanks to the intrinsic properties of this type of fiber, previously described even with reference to FIG. 2A, the polarization of the photonic pulses is modified by the fiber by keeping, for each horizontal H and vertical V polarization mode, the same weight at the input of the polarization beam splitter PBS. It splits these two components, which travel clockwise (V) and counter-clockwise (H) in the ring 100.

An electric signal 108, synchronized with the optical pulse and at relatively low voltages, can apply the phases $\phi_e$, $\phi_l$ to the two components of polarization mode, which then will be recombined in the polarization beam splitter PBS once both have fully travelled the ring 100.

Thanks to the properties of the polarization-maintaining fiber, the output polarization of the fiber coupler 4 of the polarization-maintaining fiber will be $$|\psi_{out}\rangle = \frac{1}{\sqrt{2}}(|H\rangle + e^{i(\phi_e - \phi_l)}|V\rangle)$$

The pulses then outgo again in a free space at the output of the fiber coupler 4, and, following the return direction, they are reflected by the beam splitter 3.

In this regard, it is possible noting that potential temperature variations and mechanical stresses on the fibers do not affect the polarization state outgoing from the beam splitter 3, differently from what described with reference to the state of art.

Moreover, it is important to highlight that the use of a polarization-maintaining fiber downstream of the polarization beam splitter is not intuitive, as this type of fibers is not suitable to transport general states of polarization, since its high birefringence makes the relative phase between the polarization parallel to the fast axis and the one parallel to the slow axis very unstable, then considering that the polarization dispersion can be very high.

However, it is to be noted that the same section of first polarization-maintaining fiber PM1 is travelled in both directions, and since in the return route the horizontal H and vertical V polarizations are reversed, the phase accumulated in the incoming route is perfectly compensated by the phase which is accumulated in the return route, by erasing the dispersions and making the section insensible to fiber birefringence variations.

Alternatively, the section of first polarization-maintaining fiber PM1 connected to the polarization beam splitter PBS has a slow axis oriented at 450 with respect to the input of the polarization beam splitter, or with a pre-established but however tilted angle, so obviating the needs for aligning manually the input polarization.

Figure 4:
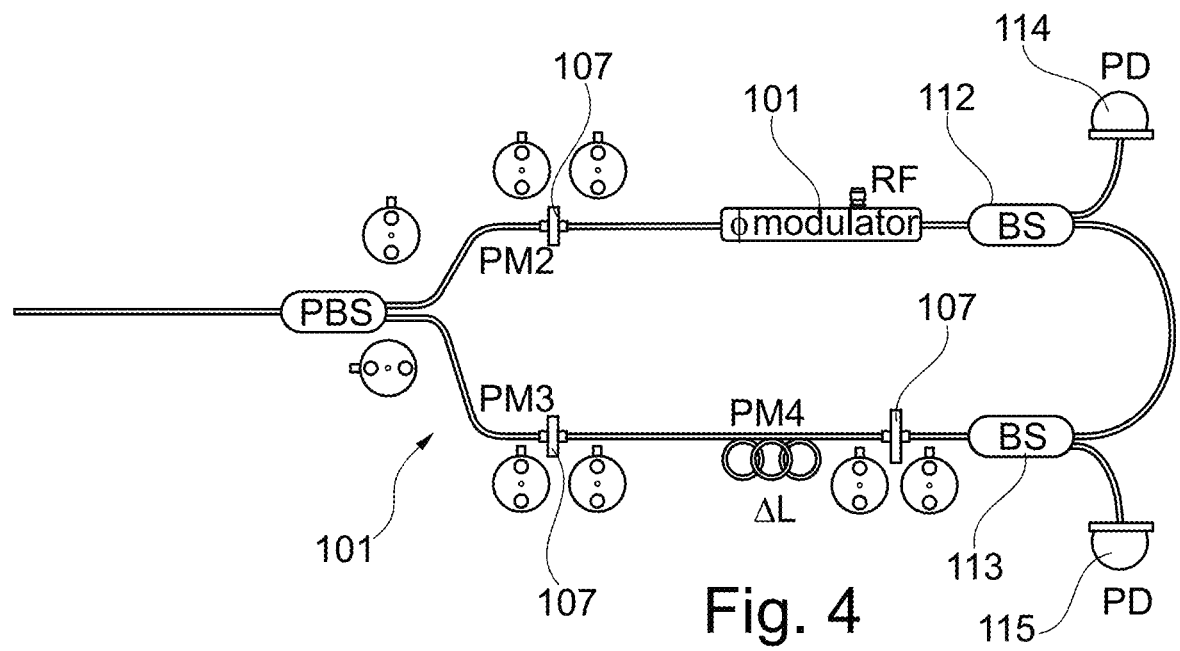
FIGS. 4 to 7 show respective schematic views illustrating Sagnac effect polarization modulators implemented according to the scheme of FIG. 2, which include certain respective variants.

Moreover, to obtain an optimum calibration and to be certain that the polarization which is inputted to the polarization beam splitter PBS is correct, it is possible to insert beam splitters 112, 113 inside the ring, connected to respective photodiodes 114, 115 to measure the intensity of the polarization modes, as it is shown in FIG. 4.

Figure 5:
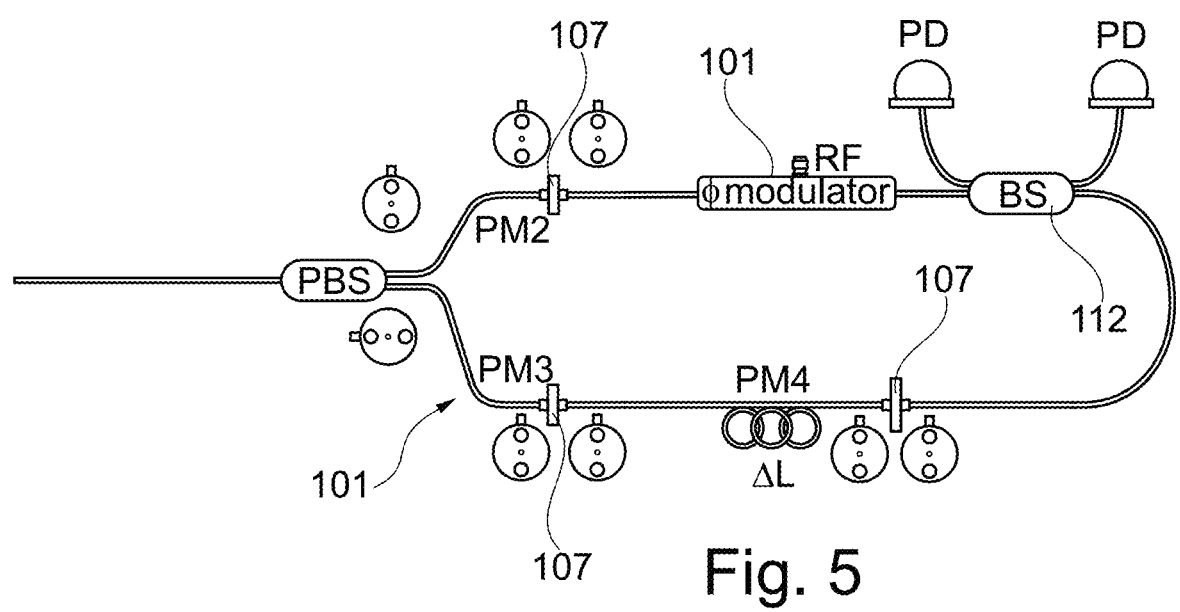

With reference to FIG. 5, it is also possible to use one single beam splitter 112, connected to two photodiodes 114, 115.

This solution can be applied also to the ring described with reference to the state of art.

Figure 6:
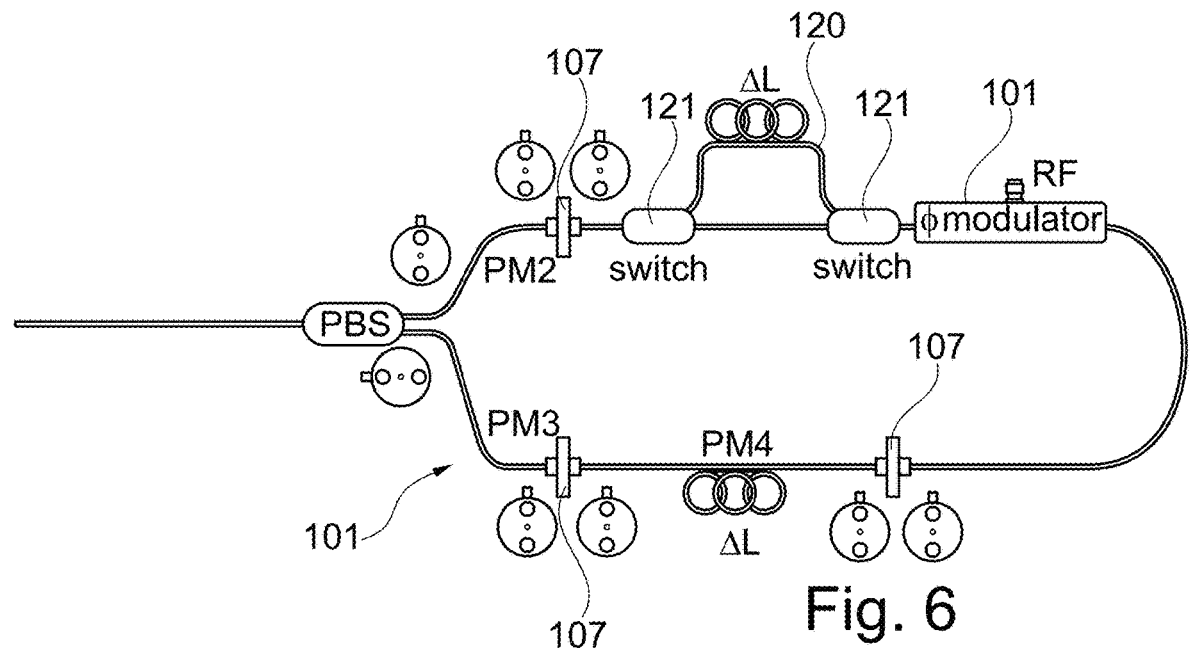

With reference to FIG. 6, an additional variant of the modulator 1, and in particular of its ring 100, is embodied by the presence of an additional delay line 120, interlaced to a section of the ring 100 by means of two switches 121, of variable type, which allows to transform the modulator 1 from a polarization modulator to a phase modulator independent from polarization.

Even this solution can be applied also to the ring described with reference to the state of art.

With reference to the modulator 1 of FIG. 3, the beam splitter 3 has an output section 9 therefrom the beam, with the horizontal H and vertical V polarization modes which have crossed the whole device, is emitted. This output section can be connected to an additional conversion device 200 to obtain the qubit required to the cryptographic key from the polarization states, which is described with reference to FIG. 7.

The output section 9 of the beam splitter 3, and then of the modulator 1, transmits the beam representing the polarization states through lambda/4 plate at 45°, designated with 201. It is capable of transforming the polarization states $$|D\rangle,|R\rangle=|H\rangle+i|V\rangle,|L\rangle=|H\rangle-i|V\rangle e|A\rangle=|H\rangle-|V\rangle$$

corresponding to the offsets $$\phi_e - \phi_l = 0, \pi/2, -\pi/2 e \pi$$

in $$|D\rangle,|H\rangle,|V\rangle e|A\rangle=|H\rangle-|V\rangle$$

this because a quarter-wave plate oriented at 45° transforms an equatorial polarization of the type $$|\psi_{out}\rangle = \frac{1}{\sqrt{2}}(|H\rangle + e^{i(\phi_e - \phi_l)}|V\rangle)$$

in a linear polarization.

Additionally, the conversion device 200 comprises an additional section of polarization-maintaining fiber with axis at 0°, designated with 202, which receives the beam 203 outgoing from said plate 201. Such section 202 transmits the fiber signal to an interferometer 204 which is of unbalanced type, formed by a second polarization beam splitter 205 and by an additional beam splitter 206. It transforms a polarization qubit into a qubit with time-bin encoding, since the second polarization beam splitter 205 and the additional beam splitter 206 are connected by two sections of polarization-maintaining optical fiber, the first direct, designated with 207, and the second, designated with 208, comprising a delay line 209.

Should the photon take the shortest route, the above-described interferometer 204 returns a state value of □0>, whereas should the photon follow the longest route, the returned state value then is □1>.

Alternatively, it is possible to enter the modulator 1 with a circular polarization |R> (and not diagonal as shown in FIG. 3), thus at the output there will be the Right circular |R>, Diagonal |D>, Antidiagonal |A> and Left circular |L> polarizations at the offsets $$\phi_e - \phi_l = 0, \pi/2, -\pi/2, \pi$$

Figure 7:
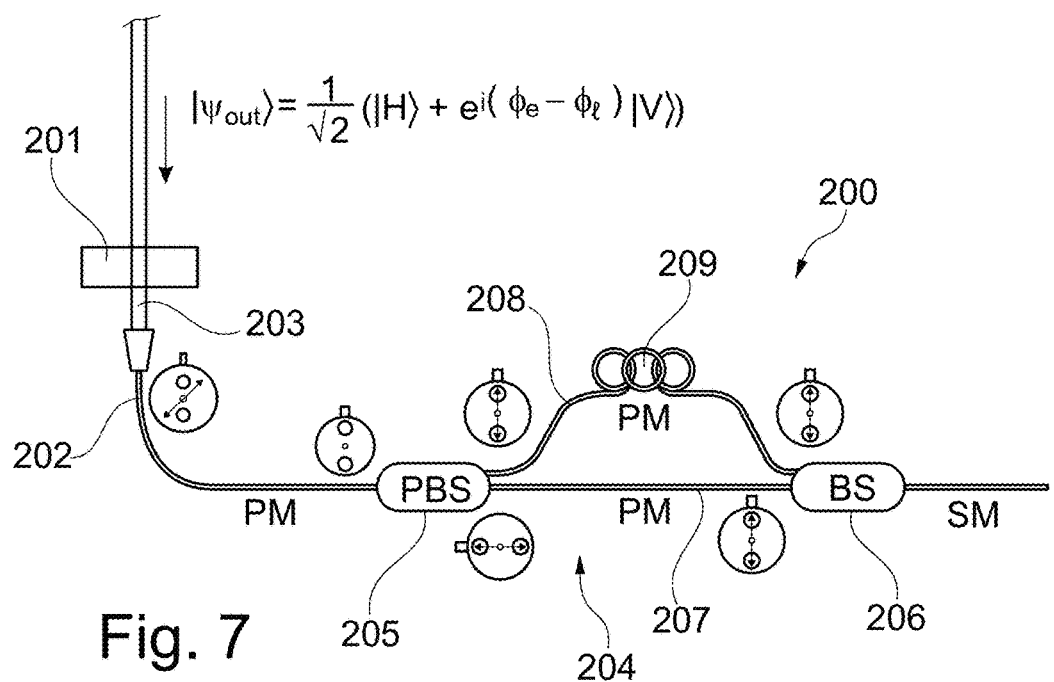

At the output, it will be sufficient to use the scheme of FIG. 7, by modifying by 450 the input of the first polarization-maintaining fiber.

To the above-described polarization modulation method and related polarization modulator a person skilled in the art, with the purpose of satisfying additional and contingent needs, could introduce several additional modifications and variants, all however comprised within the protective scope of the present invention, as defined by the enclosed claims.

The invention claimed is:

1. A polarization modulation method of photonic pulses, for generating quantum cryptographic keys, the method comprising:
    generating a stream of photonic pulses, each one comprising a given polarization state obtained by the superposition of both horizontal and vertical polarization modes thereof, and by routing the pulses in a first polarization-maintaining fiber;

splitting, inside said first polarization-maintaining fiber, said horizontal and vertical polarization modes, and routing the pulses through respective terminals of a second polarization-maintaining fiber forming a ring, whereby the pulses travel in said ring clockwise and counter-clockwise respectively, or vice versa;

inducing a respective phase modulation ($\phi_e$, $\phi_l$) of both said polarization modes, in one point of said ring which is spaced from said terminals by optical paths having different length along said ring, thereby a polarization-maintaining fiber delay line is determined; and recombining said polarization modes in one single photonic pulse beam, and routing the resulting beam through said first polarization-maintaining fiber, by obtaining, at an output thereof, a polarization state of the pulses depending upon a difference between said phase modulations ($\phi_e$, $\phi_l$).

2. The polarization modulation method according to claim 1, wherein said horizontal and vertical polarization modes are routed through the respective terminals of said second polarization-maintaining fiber by keeping said horizontal and vertical polarization modes aligned with the respective slow axes of said terminals.

3. The polarization modulation method according to claim 1, wherein, in the passage of said horizontal and vertical polarization modes through the ring formed by said second polarization-maintaining fiber, said horizontal and vertical polarization modes are reversed.

4. The polarization modulation method according to claim 1, wherein said horizontal and vertical polarization modes are routed through the respective terminals of said second polarization-maintaining fiber by keeping said horizontal and vertical polarization modes aligned with the respective fast axes of said ends.

5. The polarization modulation method according to claim 1, wherein said first polarization-maintaining fiber PM1 has a slow axis tilted with respect to the horizontal and vertical polarization modes at a splitting thereof.

6. The polarization modulation method according to claim 5, wherein said first polarization-maintaining fiber PM1 has a slow axis tilted by 45° with respect to the horizontal and vertical polarization modes at the splitting thereof.

7. The polarization modulation method according to claim 1, wherein at the output said polarization state of the pulses depending upon the difference between said phase modulations ($\phi_e$, $\phi_l$) is modified by transforming a respective equatorial polarization into a linear polarization.

8. A polarization modulator (1) of photonic pulses, for generating quantum cryptographic keys, comprising:

a photonic pulses generator (2), routing photonic pulses through a first polarization-maintaining optical fiber (PM1) toward a polarization beam splitter, to which two terminals (PM2, PM3) of a second polarization-maintaining fiber (102) are connected forming a ring, said terminals (PM2, PM3) receiving from the polarization beam splitter (PBS) a respective polarization mode coming from said first polarization-maintaining optical fiber (PM1), a phase modulator (101) being provided acting on said polarization modes in a point, of said ring (100), which is spaced from said terminals by optical paths, along said ring, having different length, thereby a polarization-maintaining fiber delay line (PM4) is determined, a beam splitter (3) being provided to split a returning beam, the splitter being arranged between an input of said first polarization-maintaining optical fiber (PM1) and the photonic pulses generator (2), whereby the first polarization-maintaining optical fiber (PM1) is again fully travelled by the returning beam.

9. The polarization modulator (1), according to claim 8, wherein said polarization beam splitter (PBS) aligns the polarization modes separated by the polarization beam splitter (PBS) to slow axes of the respective ends (PM2, PM3) of the second polarization-maintaining fiber (102).

10. The polarization modulator (1), according to claim 8, wherein said polarization beam splitter (PBS) aligns the polarization modes separated by the polarization beam splitter (PBS) to fast axes of the respective ends (PM2, PM3) of the second polarization-maintaining fiber (102).

11. The polarization modulator (1), according to claim 8, wherein said ring (100) comprises a polarization rotator to compensate the mode dispersion effects when said polarization beam splitter (PBS) aligns the polarization modes separated by the polarization beam splitter (PBS) to fast and slow axes, or vice versa, of the respective terminals (PM2, PM3) of the second polarization-maintaining fiber (102).

12. The polarization modulator (1), according to claim 8, wherein said phase modulator (101) is driven by means of an electric signal (108) synchronized with phase modulations ($\phi_e$, $\phi_l$) acting on said polarization modes.

13. The polarization modulator (1), according to claim 8, wherein one or more beam splitters (112, 113) are arranged along the second polarization-maintaining optical fiber (102), connected to one or more photodiodes (114, 115) to measure an intensity of the polarization modes.

14. The polarization modulator (1), according to claim 8, wherein an additional delay line (120) is formed on the second polarization-maintaining optical fiber (102), interlaced thereto by means of two variable diverters (121), which allow a transforming of the modulator (1) from a polarization modulator to a phase modulator independent from polarization.

15. The polarization modulator (1), according to claim 8, wherein the beam splitter (3) has an output section (9), therefrom the beam of the polarization states is emitted, which is connected to a time-bin conversion device (200) comprising lambda/4 plate at 45° (201) which is crossed by the beam of the polarization states, connected to an additional section of polarization-maintaining fiber (202) with axis at 0° which receives the beam (203) outgoing from said plate (201) and transfers the beam (203) to an unbalanced interferometer (204).

16. The polarization modulator (1), according to claim 15, which is fed with a circular polarization (|R>), wherein the signal at an input of the conversion device (200) is modified by 45° at an input of said additional section of polarization-maintaining fiber (202).

* * * * *